(12) United States Patent
Levinson (10) Patent No.: US 8,068,739 B2
(45) Date of Patent: Nov. 29, 2011

(54) MODULAR OPTICAL DEVICE THAT INTERFACES WITH AN EXTERNAL CONTROLLER

(75) Inventor: Frank H. Levinson, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 866 days.

(21) Appl. No.: 10/866,483

(22) Filed: Jun. 11, 2004

(65) Prior Publication Data

US 2005/0025502 A1 Feb. 3, 2005

Related U.S. Application Data

(60) Provisional application No. 60/477,867, filed on Jun. 12, 2003, provisional application No. 60/498,825, filed on Aug. 29, 2003, provisional application No. 60/498,966, filed on Aug. 29, 2003, provisional application No. 60/499,047, filed on Aug. 29, 2003.

(51) Int. Cl.
*H04B 10/00* (2006.01)
(52) U.S. Cl. ........................................ 398/135
(58) Field of Classification Search ............... 398/135
See application file for complete search history.

(56) References Cited

U.S. PATENT DOCUMENTS

| | | | |
|---|---|---|---|
| 4,689,795 A | 8/1987 | Yoshimoto et al. | |
| 5,042,042 A | 8/1991 | Hori et al. | |
| 5,237,441 A | 8/1993 | Nhu | |
| 5,383,208 A | 1/1995 | Queniat | |
| 5,644,654 A | 7/1997 | Onokera | |
| 5,787,114 A | 7/1998 | Ramamurthy et al. | |
| 5,812,572 A * | 9/1998 | King et al. | 372/38.04 |
| 5,844,928 A | 12/1998 | Shastri et al. | |
| 5,956,168 A | 9/1999 | Levinson et al. | 359/152 |
| 6,043,443 A | 3/2000 | Doran et al. | |
| 6,313,459 B1 | 11/2001 | Hoffe | |
| 6,385,226 B2 | 5/2002 | McMinn et al. | |
| 6,430,201 B1 | 8/2002 | Azizoglu | |
| 6,554,492 B2 * | 4/2003 | Gilliland et al. | 385/88 |
| 6,667,998 B1 * | 12/2003 | Lo et al. | 372/34 |
| 6,734,959 B2 | 5/2004 | Griffiths et al. | |
| 6,760,353 B2 | 7/2004 | Wang | |
| 6,832,052 B1 * | 12/2004 | Marmur | 398/175 |

(Continued)

FOREIGN PATENT DOCUMENTS

CA 2528989 12/2008

(Continued)

OTHER PUBLICATIONS

"Gigabit Interface Converter (GBIC)" Edited by R. Snively, SFF Committee, Sep. 27, 2000.*

(Continued)

*Primary Examiner* — Shi K Li
(74) *Attorney, Agent, or Firm* — Machoff Gilmore & Israelsen (57) ABSTRACT

Optical modules described herein include optical components such as lasers or photodiodes for communicating on fiber-optic networks. The lasers and photodiodes have analog interface such that the lasers and photodiodes can be controlled by a controller external to the optical modules. The optical modules also include memory modules. The memory modules store operating characteristics of the lasers and photodiodes. The operating characteristics can be read via digital interfaces that are connected to the memory modules. This allows the controller to appropriately adjust signals such that a randomly selected controller may be used with a randomly selected optical module.

24 Claims, 5 Drawing Sheets

U.S. PATENT DOCUMENTS

| | | | | |
|---|---|---|---|---|
| 6,842,711 B2 * | 1/2005 | Liu et al. | | 702/107 |
| 6,894,266 B2 * | 5/2005 | Richard et al. | | 250/214 R |
| 6,931,464 B1 * | 8/2005 | Reeves | | 710/62 |
| 6,934,310 B2 * | 8/2005 | Brophy et al. | | 372/38.02 |
| 7,062,164 B2 | 6/2006 | Ames et al. | | |
| 7,127,648 B2 | 10/2006 | Jiang et al. | | |
| 7,139,488 B1 | 11/2006 | Mituhashi | | |
| 7,151,894 B2 * | 12/2006 | Fan et al. | | 398/22 |
| 7,161,882 B2 * | 1/2007 | Lehr et al. | | 369/47.51 |
| 7,166,826 B1 | 1/2007 | Kunst et al. | | |
| 7,206,392 B2 | 4/2007 | Fingler et al. | | |
| 7,215,891 B1 | 5/2007 | Chiang et al. | | |
| 7,223,964 B2 * | 5/2007 | Wiese et al. | | 250/239 |
| 7,286,756 B1 | 10/2007 | Marshall et al. | | |
| 7,299,290 B2 | 11/2007 | Karpoff | | |
| 7,317,689 B1 | 1/2008 | Liu | | |
| 7,463,674 B2 | 12/2008 | Woolf et al. | | |
| 2002/0027688 A1 | 3/2002 | Stephenson | | 359/152 |
| 2002/0149821 A1 | 10/2002 | Aronson et al. | | |
| 2002/0190666 A1 | 12/2002 | Sakamoto et al. | | |
| 2003/0023780 A1 | 1/2003 | Husted et al. | | |
| 2004/0033079 A1 | 2/2004 | Sheth et al. | | |
| 2004/0052299 A1 * | 3/2004 | Jay et al. | | 374/183 |
| 2004/0062245 A1 | 4/2004 | Sharp et al. | | |
| 2004/0130397 A1 * | 7/2004 | Mactaggart | | 330/308 |
| 2004/0136729 A1 | 7/2004 | Robinson et al. | | |
| 2004/0228627 A1 * | 11/2004 | Alana et al. | | 398/9 |
| 2006/0154387 A1 | 7/2006 | Mueller | | |

FOREIGN PATENT DOCUMENTS

| CA | 2528989 | 11/2009 |
|---|---|---|

OTHER PUBLICATIONS

U.S. Appl. No. 11/118,589, filed Apr. 29, 2005, Levinson.
U.S. Appl. No. 10/929,978, filed Aug. 30, 2004, Levinson.
U.S. Appl. No. 10/929,923, filed Aug. 30, 2004, Levinson.
U.S. Appl. No. 10/929,178, filed Aug. 30, 2004, Levinson.
U.S. Appl. No. 11/118,589, filed Mar. 17, 2008, Office Action.
U.S. Appl. No. 11/118,589, filed Aug. 1, 2008, Office Action.
U.S. Appl. No. 11/118,589, filed Apr. 8, 2009, Office Action.
U.S. Appl. No. 11/118,599, filed Nov. 4, 2009, Final Office Action.
U.S. Appl. No. 10/929,178, filed Jan. 4, 2010, Office Action.
"The 12C-Bus Specification" version 2.1, Jan. 2000, Phillips Semiconductors.
E. Yeh et al., "Introduction to TCP/IP Offload Engine (TOE)", Version 1.0, Apr. 2002, 10 Gigabit Ethernet Alliance, www.10gea.org.
Finisar (App Note AN-2025, Finisar Corporation, 1998).
"Broadcom Debuts 10-gigabit Ethernet/Fiber Channel Transceiver," Entrepreneur, May 1, 2003 (available at http://www.entrepreneur.com/tradejournals/article/100169088.html).
Xenpak 10 gigabit Ethernet Transceiever Pakage, Issue 3.0, Sep. 18, 2002.
Curvefitting Toolbox User's Guide. Version 1. The MathWorks, Inc. 2002.
U.S. Appl. No. 10/929,178, filed Dec. 14, 2007, Office Action.
U.S. Appl. No. 10/929,178, filed Jul. 25, 2008, Office Action.
U.S. Appl. No. 10/929,178, filed Dec. 31, 2008, Office Action.
U.S. Appl. No. 10/929,178, filed Aug. 25, 2009, Office Action.
U.S. Appl. No. 10/929,978, filed Jan. 29, 2008, Office Action.
U.S. Appl. No. 10/929,978, filed Jul. 18, 2008, Office Action.
U.S. Appl. No. 10/929,978, filed Mar. 27, 2009, Office Action.
U.S. Appl. No. 10/929,978, filed Nov. 4, 2009, Office Action.
U.S. Appl. No. 10/929,923, filed Jan. 3, 2008, Office Action.
U.S. Appl. No. 10/929,923, filed Jun. 18, 2008, Office Action.
U.S. Appl. No. 10/929,923, filed Dec. 15, 2008, Office Action.
U.S. Appl. No. 10/929,923, filed Jul. 31, 2009, Office Action.
U.S. Appl. No. 10/929,923, filed Jan. 15, 2010, Office Action.
U.S. Appl. No. 10/929,178, filed Jun. 16, 2010, Final Office Action.
U.S. Appl. No. 10/929,923, filed Jul. 14, 2010, Final Office Action.
U.S. Appl. No. 10/929,978 Office Action mailed May 6, 2011.
U.S. Appl. No. 10/929,923 Office Action mailed Apr. 21, 2011.

* cited by examiner

MODULAR OPTICAL DEVICE THAT INTERFACES WITH AN EXTERNAL CONTROLLER

CROSS-REFERENCE TO RELATED APPLICATIONS

This application claims the benefit of U.S. Provisional Application Nos. 60/477,867, titled Modular Optical Device That Interfaces With External Controller, filed Jun. 12, 2003, 60/498,825, titled Modular Controller That Interfaces With Modular Optical Device, filed Aug. 29, 2003, 60/498,966, titled Testing and Storing Tuning Information in Modular Optical Devices, filed Aug. 29, 2003 and 60/499,047, titled Computer System With Modular Optical Devices, filed Aug. 29, 2003, which are incorporated herein by reference.

BACKGROUND OF THE INVENTION

1. The Field of the Invention

The invention generally relates to fiber-optic networking components. More specifically, the invention relates to fiber-optic components that allow for optical networking hardware to be implemented on computer systems.

2. Description of the Related Art

Computer processing power and speed continues to advance at an amazing rate. However, the continued growth of power and speed is not unexpected. In 1965, Gordon Moore predicted that the number of transistors, and hence the processing power and speed of computer chips, would double every couple of years. This predicts an exponential growth in processing power and speed. This prediction has been referred to as Moore's Law. Moore's law has generally held true.

In a modern computer, the microprocessor has several support components. For example, the microprocessor is connected to memory where the memory is used to store data, computer instructions and the like. For processing power and speed increases to be useful in a microprocessor, the speed of supporting components should scale with the processing power and speed of the microprocessor. For example, if memory connected to the processor is too slow, the processor must remain idle while fetching instructions or data from the memory. Thus, the increased processing power and speed of the processor is wasted.

Computer microprocessors and much of the supporting circuitry is based on silicon chip technology. At present, microprocessors and the supporting circuitry have generally scaled fairly well together. Best estimates also suggest that silicon based computers still have 10 to 15 years of processing power and speed increases if following Moore's Law.

Figure 1:
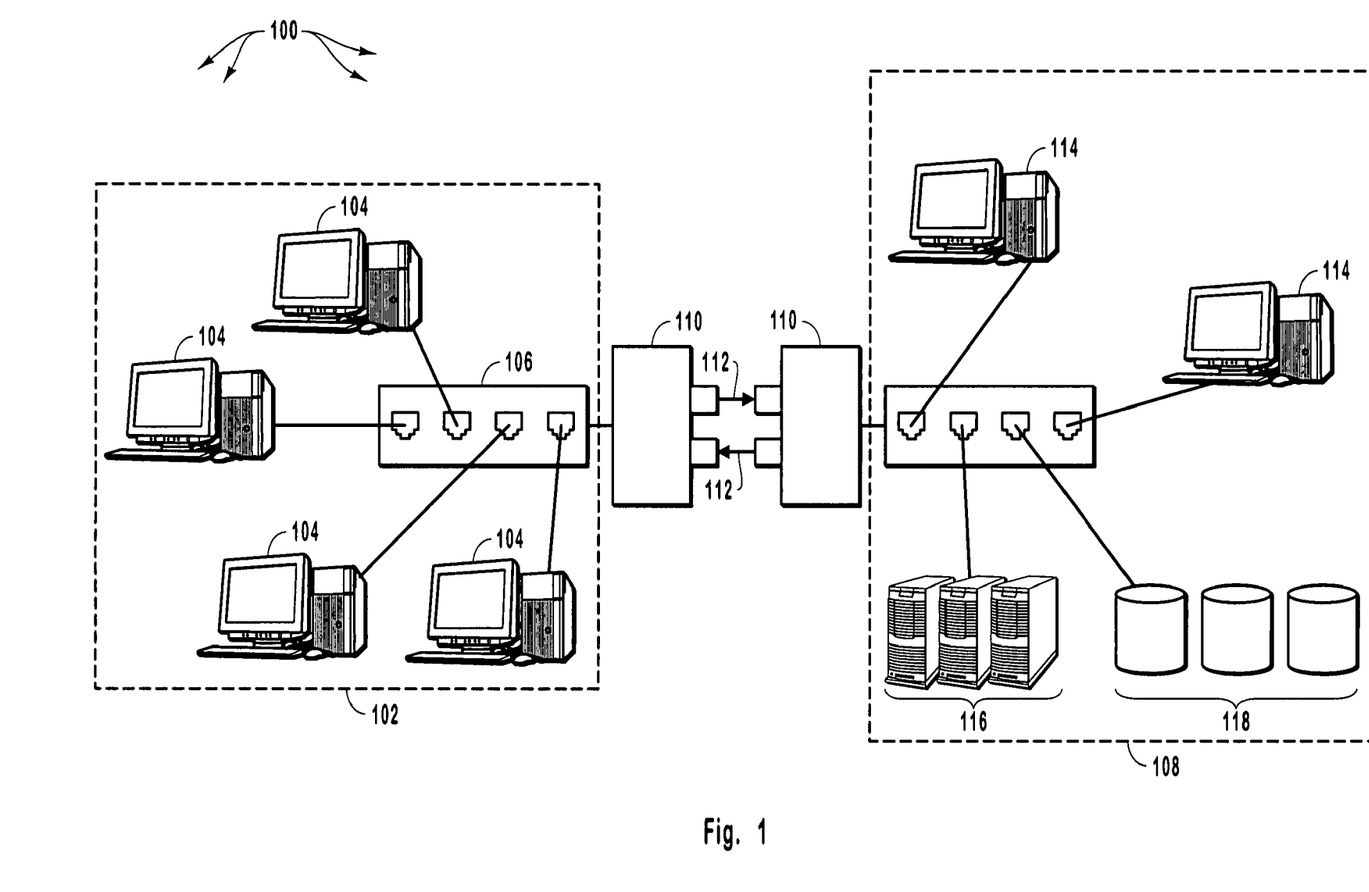
FIG. 1 illustrates an exemplary topology where clients are interconnected through local area networks and wide area networks.

One especially useful implementation of modern computers involves the interconnection of computers for transferring and sharing data between the computers. A small or moderate number of computers may be grouped together in a given location. This type of network is known as a local area network (LAN). LANs may be connected to other LANs to form a wide area network (WAN). An example of this type of configuration is shown in FIG. 1 which illustrates a topology 100 with a number of interconnected computer clients on LANs and WANs. Exemplary LANs include home networks, local office network and the like. Exemplary WANs include interconnected office LANs and the ubiquitous Internet.

Referring now to FIG. 1, a first LAN 102 includes a number of clients 104 interconnected by router 106 (also referred to herein as a "hub 106"). The LAN 102 in FIG. 1 uses copper wire based Ethernet, such as the protocol specified in IEEE 802.3. The LAN 102 is connected to a second LAN 108. The LANs 102 and 108 are connected in the example shown in FIG. 1 by routers 110 that are designed to send and receive large amounts of data. The routers 110 may be for example Huge Fast Routers (HFRs) and the like. In the example shown in FIG. 1, the routers 110 are interconnected using fiber-optic communications as shown by the fiber-optic links 112.

The second LAN 108 includes a number of clients 112. The clients 112 may be similar to the clients 104 in the first LAN 102. The second LAN 108 also includes a storage area network (SAN) 114 and a network of servers 116. The SAN 114 and network of servers 116 provide centralized locations for data that may be used by clients 104, 112 on the first LAN 102 and second LAN 108. Accessing data on the network of servers 116 and SAN 114 should ideally be transparent to users at the client computers 104 and 112. In other words, a user at a given client in the topology 100 should not experience any noticeable difference when accessing data on either any other client in the topology, the network of servers 116, or the SAN 114 as compared to when accessing data stored on the given client itself.

Referring now to the first LAN 102 for ease of explanation, the clients 104, as mentioned above, are interconnected through a hub 106 using an Ethernet protocol. A common Ethernet protocol is 100 BT that runs at 100 megabits per second (Mb/s). Alternatively, the clients 104 may be interconnected using a wireless protocol such as 802.11 which runs at around 56 Mb/s Currently, there also exist systems that operate at 1000 Mb/s. These systems are called Gigabit Ethernet systems. Ethernet systems that use copper wire are quickly approaching their useful limit. As the data rate increases, the useful distance that data may be transmitted across the copper wire decreases. Alternatively, the cables used for interconnecting computers become expensive or difficult to install.

Likewise, wireless Ethernet alternatives are limited by frequency. Various regulatory organizations such as the FCC limit the frequency range in which wireless signals may be transmitted. Limited frequency range translates directly into limited bandwidth. Consequently, Ethernet applications based on copper wire or wireless implementations have limited data rates.

Some experts have suggested that Gigabit Ethernet is as fast as copper wire systems will operate efficiently. Wireless systems are also quickly approaching their limits as far as bandwidth is concerned. Thus, while silicon chip technology still has ample amounts of growth potential, it is anticipated that the conventional network systems that commonly interconnect silicon chip systems have reached (or are quickly reaching) their maximum potential.

As mentioned previously, modern computer systems use network information. In fact, much of the data used by a computer system is typically stored away from the computer system on a network device. As noted above, it is desirable that fetching of network information from the network be transparent to a computer user. However, if network speeds are significantly lower than computer system speeds, fetching the data will not be transparent. Thus, faster networks are needed to scale with computer processing speed as computer processing speed increases.

As shown in FIG. 1, LANs may be interconnected using fiber-optics such as the fiber-optic links 112 between the routers 110. Fiber-optic networks can operate at much higher data rates than copper wire or wireless networks. However, while the fiber-optic networks can transmit data between LANs at high speeds, a bottleneck still remains because of the copper wire or wireless based connections at the LANs themselves. Further, the routers interconnecting various LANs (as well as the routers at the LANs themselves) implement a function where the router collects an entire subset of data before transmitting it to a target network or computer system. This is commonly referred to as store and forward. This results in a bottleneck where all of the data for a packet or other subset of data is collected before forwarding to the next point (such as a router) in a network. Thus, the more conventional routers (whether copper wire or fiber based) that are used in a network, the more delay is caused by the cumulative effect of the store and forward operations.

Fiber-optic LANs, where each computer has a fiber-optic connection for connecting to the LAN, help to eliminate some of the problems described above. To connect to a fiber-optic LAN, each computer has a transceiver. The transceiver includes a laser for generating an optical signal. The laser is connected in the transceiver to a laser driver. The laser driver is further connected to other control circuitry in the transceiver. The transceiver receives a digital signal. The digital signal is processed by the control circuitry to improve the quality of the signal such as by removing noise and jitter. The laser driver converts the processed signal to an analog driving signal for modulating the laser output with the digital signal.

The transceiver also includes a photodiode that is included in circuitry for receiving optical signals and converting them to digital signals. The photodiode is connected to a transimpedance amplifier to boost the strength of the electrical signal produced when photons from the optical network signal strike the photodiode. Following the transimpedance amplifier is a post amplifier. The post amplifier further amplifies and feeds the signal from the transimpedance amplifier to other circuitry that is included to process and convert the electrical signal to a digital signal for use by a computer on which the transceiver is installed.

Transceivers are more expensive to manufacture than traditional 802.3 copper wire interfaces and thus have not widely been implemented on computers within a LAN. Thus copper or wireless LANs continue to be those most used. Because copper and wireless based communications will soon be the bottleneck in LAN connected computer system, it would be useful to provide methods and apparatus to lessen the cost of implementing fiber-optic communications on computer systems.

BRIEF SUMMARY OF THE INVENTION

One exemplary embodiment of the invention is embodied as an optical module. The optical module is connectable in a computer system and provides a laser source for transmitting optical signals. The optical module includes a laser for generating optical signals for transmission on an optical network. The laser is connected to an analog interface. The analog interface is arranged such that it can receive electrical signals from a driving source that is external to the optical module. The driving source drives the laser to produce the optical signal for transmission on the optical network. The optical module further includes a memory module. The memory module includes a digital representation of operating characteristics of the laser. A digital interface is connected to the memory module. The digital interface is arranged to allow an external digital device to retrieve digital representation of the operating characteristics.

Another optical module constructed in accordance with principles of the present invention includes a photosensitive device. The photosensitive device is arranged to receive optical signals from a fiber-optic network. The photosensitive device is connected to a transimpedance amplifier. The transimpedance amplifier is connected to an analog interface to deliver electrical signals produced by the transimpedance amplifier to a controller external to the optical module. The optical module further includes a memory module that includes a digital representation of operating characteristics of the photosensitive device. A digital interface is connected to the memory module to allow an external controller to access the digital representation of the operating characteristics.

Another optical module constructed in accordance with principles of the present invention includes a laser and a photodiode. The laser is connected to an analog interface accessible external to the optical module. This allows an external controller to modulate the laser with data for transmission on an optical network. The photodiode is connected to a transimpedance amplifier. The transimpedance amplifier is further connected to an analog interface accessible external to the optical module. This allows analog signals caused by the reception of optical data to be transmitted to an external controller for use by a network client. The optical module includes a memory module. The memory module includes digital representations of operating characteristics of the the laser and photodiode. The memory module is connected to a digital interface accessible by an external controller. This allows the external controller to appropriately modulate the specific laser and appropriately interpret signals from the transimpedance amplifier.

Advantageously, embodiments of the present invention may be installed in computer equipment such that they can be randomly matched with a controller. By storing operating characteristics in a memory, the controller can retrieve the operating characteristics and adjust itself appropriately to allow for proper operation of the optical modules. This allows for economical and efficient manufacturing of optical network hardware in computer devices.

These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments and are not therefore to be considered limiting of its scope, the invention will be described and explained with additional specificity and detail through the use of the accompanying drawings in which.

DETAILED DESCRIPTION OF THE INVENTION

Figure 2:
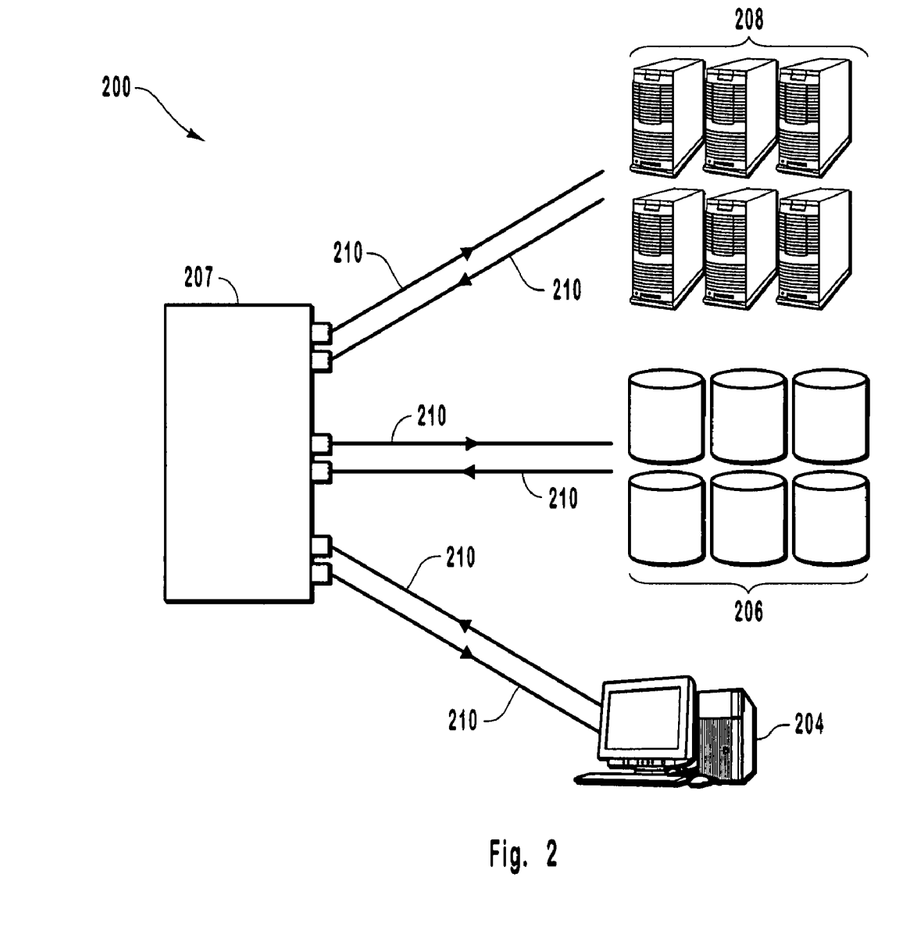
FIG. 2 illustrates a local area network where various components are interconnected with fiber-optic interconnection.

Referring now to FIG. 2, an exemplary topology where embodiments of the present invention may be practiced is shown. FIG. 2 illustrates a topology 200 that in the example shown is a LAN. The LAN includes a fiber-optic router 207. In the topology 200, the fiber-optic router 207 interconnects a network client 204 to network storage (such as a SAN) 206 and a bank of servers 208. The network client 204 includes a fiber-optic interface for connecting to the fiber-optic router 207 using fiber-optic connections 210. The network storage 206 and bank of servers 208 are also connected to the fiber-optic router 207 via other fiber-optic connections 210. The bandwidth limitations of copper wire based Ethernet and wireless Ethernet connections are obviated by using fiber-optic interconnections.

Commonly available fiber-optic connections and standards currently allow for various different data rates. One standard is Fast Ethernet. Fast Ethernet operates at 100 Mb/s. Another standard is Gigabit Ethernet. Gigabit Ethernet operates at 1000 Mb/s. Yet another standard is 10 Gigabit Ethernet. 10 Gigabit Ethernet operates at 10,000 Mb/s. Fast Ethernet and Gigabit Ethernet are commonly used when clients on a network communicate with each other or when clients communicate with servers.

Yet another standard is SONET. Currently, SONET specifies a number of different data rates including 51.84 Mb/s, 155.52 Mb/s, 622.08 Mb/s, 2.488 gigabits per second, 9.953 gigabits per second, and 39.813 gigabits per second. Yet another standard is Fibre Channel. Fibre Channel typically operates at speed of at least 100 Mb/s. SONET and Fibre Channel are presently used to communicate with storage such as network storage 206 on a network.

Another optical standard is Infiniband. Infiniband generally operates at 2500 Mb/s. Infiniband is often used for clustering. Clustering involves the use of several computer systems in a distributed computing environment. Thus, computing tasks are divided up among the computer systems in the cluster.

Additionally, fiber-optic networks have ample room for scaling to higher frequencies as needed. Such scaling may be accomplished for example by increasing transmission speeds. Alternatively, scaling may be accomplished by using multiplexing schemes where multiple wavelengths of light are transmitted on a network. Each wavelength of light provides a stream of data. To scale up the network bandwidth, one or more additional wavelengths are transmitted onto the network.

Figure 3:
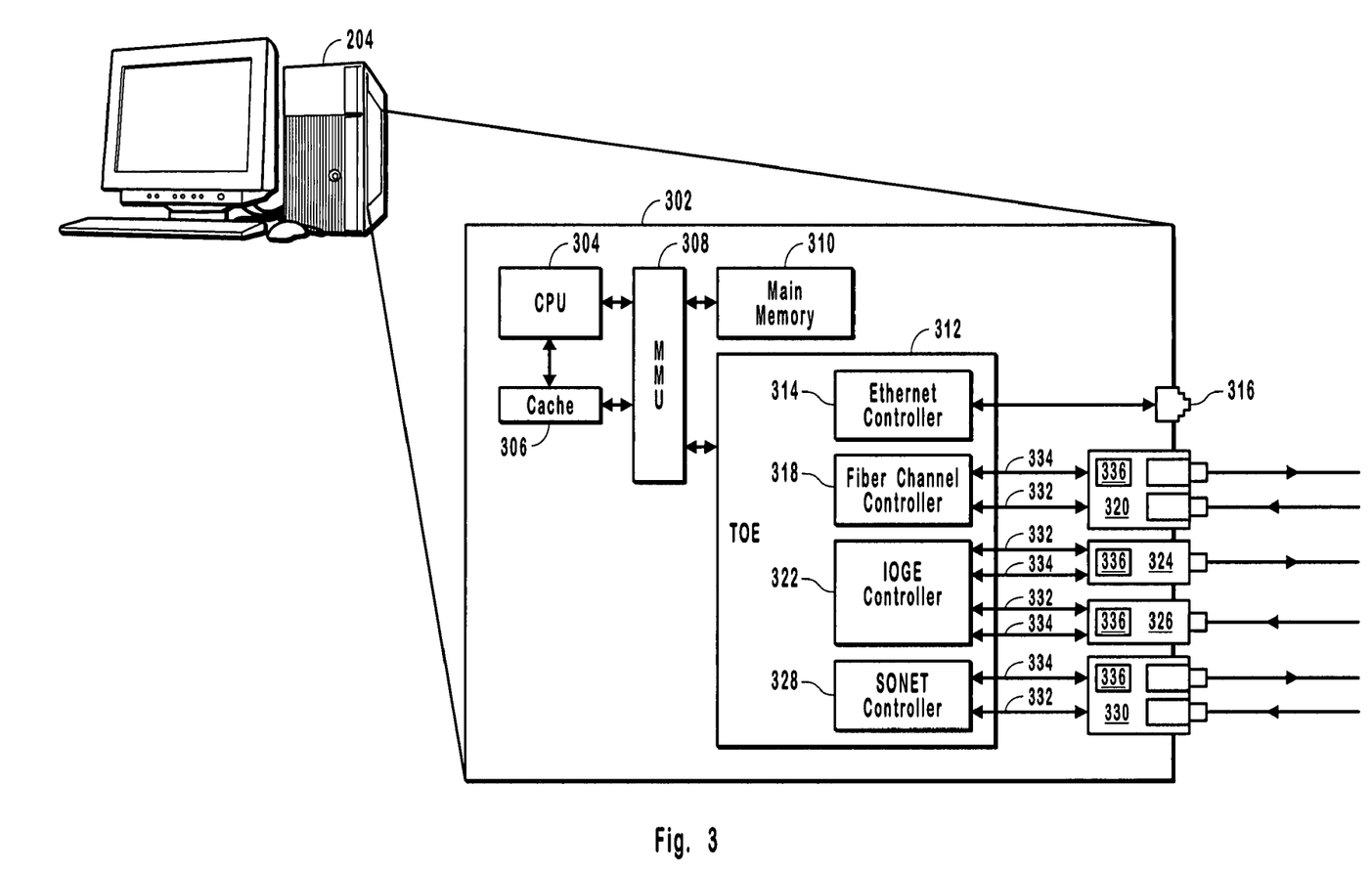
FIG. 3 illustrates an exemplary network client with fiber-optic networking capabilities.

Referring now FIG. 3, one embodiment of the network client 204 is illustrated. Notably, while the network client 204 is shown as a general purpose computer, other devices may implement the functionality of the network client including but not limited to personal digital assistants (PDAs), storage devices, servers, hubs, routers, switches, and the like. A typical network client such as network client 204 includes a motherboard 302 where various components are mounted. Generally; a network client includes a central processing unit 304. The central processing unit 304 is attached to cache memory 306. The cache memory 306 may include instructions that are executed by the central processing unit 304. The cache memory 306 may also include data generated by processes on the central processing unit 304, or data used in processes by the central processing unit 304. The central processing unit 304 and cache memory 306 are attached to a memory management unit 308. The memory management unit 308 controls how data items stored in various memory components in the network client 204 are accessed by the central processing unit 304. Further the memory management unit 308 helps to coordinate how and where data items are stored in the various memory components in the network client 204. Main memory 310 is also coupled to the memory management unit 308. The main memory 310, while not as fast as the cache memory 306, is useful for storing programs or sets of instructions being performed by the central processing unit 304, data items generated by processes in the CPU 304, data items needed for processes being performed by the central processing unit 304, and the like.

The memory management unit 308 is further connected to a Transmission Control Protocol/Internet Protocol (TCP/IP) offloading engine (TOE) 312. TCP/IP is the protocol used by most modern networks including the Internet. The TOE 312 provides support for communications that use the TCP/IP protocol stack. The TOE 312 relieves the central processing unit 304 from having to manage detailed computations and memory moves associated with handling TCP/IP traffic. The TOE 312 is often implemented as a microprocessor or as a field programmable gate array (FPGA). Additionally, the TOE 312 is often fabricated on a silicon wafer chip. There is often unused space on the silicon wafer chips in a conventional TOE 312. Thus, in one embodiment optical controllers are formed as a part of the TOE 312. In other embodiments, the optical controller may be formed on other chips with unused space. Alternatively a chip dedicated to optical controller and other network controller may be implemented on the network client 204.

In one embodiment, several different controllers are implemented on the TOE 312 to support various types of copper wire and optical communications. In the example shown in FIG. 3, an Ethernet controller 314 is connected to an RJ45 jack 316. A Fibre Channel controller 318 is connected to an optical module 320. A 10 gigabit Ethernet controller 322 is connected to a laser module 324, which is a specialized optical module including a laser, and a photosensitive module 326 which is a specialized optical module including a photosensitive device. A SONET controller 328 is connected to an optical module 330.

The fiber-optic controllers 318, 322, 328, each have analog connections 332 and digital connections 334 to the optical modules or lasers and photosensitive modules as appropriate. The analog connections 332 allow analog driving signals to be delivered to, or analog signals to be received from photo modules, lasers, and photosensitive modules as appropriate. Notably, while some of the signals sent to the optical modules, laser modules and photosensitive modules are referred to herein as analog signals, those of skill in the art will understand that these signals are representative of digital signals, and may take the form of square waves typically associated with digital signals. Analog signals to lasers are at a level to cause the laser to output a particular level of optical power. Analog signals received from photosensitive devices such as the photosensitive module correspond to a particular optical power level received by the photosensitive device from an optical signal.

The controllers 318, 322, 328 are shown as implementing a particular protocol or standard (i.e. Fibre Channel 318, 10 Gigabit Ethernet 322, and SONET 328). However, other embodiments of the present invention also contemplate controllers that are able to be used universally. Controllers that are able to be used universally are able to comply with the appropriate standard or protocol depending on the type of optical module, laser module and/or photosensitive module connected to the controller. Alternatively, a controller can recognize the protocol of data received on an optical network such that the controller is caused to conform to the particular standard. In this way, the controllers can be arranged to support those connections that a network client needs while optimizing the number of controllers for each use.

The controllers are connected to optical modules 320 and 330, laser modules 324, and/or photosensitive modules 326. The connection may be implemented, in one example, by traces on a printed circuit board. The optical modules 320, laser modules 324, and/or photosensitive modules 326 may be mounted to the printed circuit board by soldering or any other appropriate technique. Alternatively, a receptacle may be attached to the printed circuit board such that the optical modules 320 and 330, laser modules 324, and/or photosensitive modules 326 can be installed in the receptacle as pluggable modules.

In the example shown, the optical modules 320 and 330, laser module 324, and photosensitive module 326 each include a memory 336. The memory 336 stores various operating parameters of components within the optical modules 320 and 330, laser module 324, and photosensitive module 326. The digital connections 334 allow for operating parameters stored in the memory 336 on the photo modules, lasers and photosensitive modules to be delivered to the controllers 318, 322, 328. These operating parameters, in one embodiment invention, specify the operating characteristics of devices such as laser diodes and photosensitive devices such as photodiodes. These operating characteristics may be specific to an individual laser diode or photodiode. Using principles of embodiments of present invention, calibration data may be gathered when a photo module, laser, photosensitive module and the like are fabricated. This will be discussed in more detail below in conjunction with the description of subsequent figures.

Figure 4A:
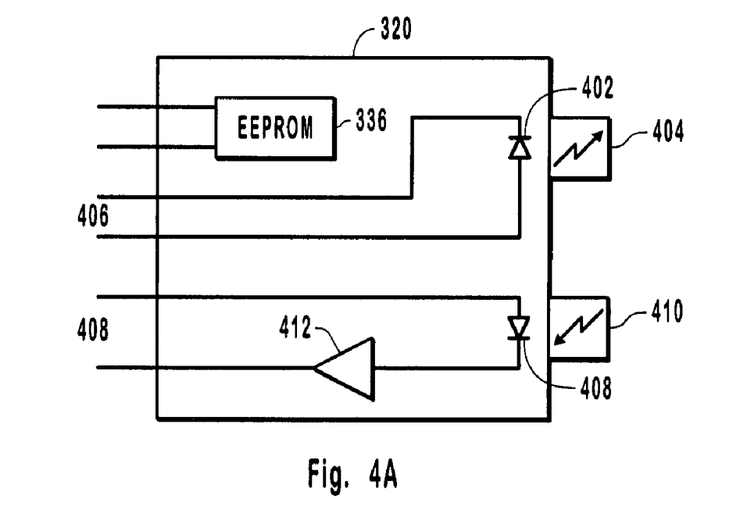
FIG. 4A illustrates an optical module including laser and photosensitive device.
Figure 4B:
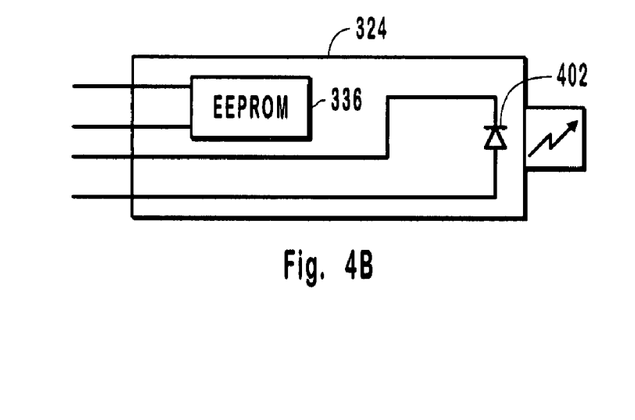
FIG. 4B illustrates an optical module including a laser.
Figure 4C:
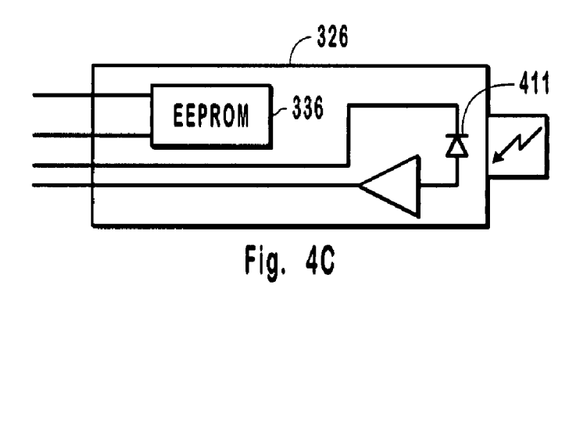
FIG. 4C illustrates an optical module including a photosensitive device.

FIGS. 4A, 4B and 4C illustrates various embodiments that include optical modules, laser modules and photosensitive modules constructed in accordance with various principles of the present invention. FIG. 4A illustrates an optical module 320. The optical module 320 includes a laser diode 402. The laser diode 402 is configured to transmit optical signals through an optical port 404 onto an optical network using optical connections such as connections 210 shown in FIG. 2. The laser diode 402 is connected to an analog interface that includes analog interface pins 406. The analog interface pins 406 are accessible to components and circuitry external to the optical module 320. Illustratively and referring again to FIG. 3, a controller such as the Fibre Channel controller 318 is connected through the analog interface 332 to the analog interface pins 406 (FIG. 4) of the optical module 320.

Referring again to FIG. 4, the optical module 320 further includes a photodiode 408. The photodiode 408 receives optical signals through an optical port 410. The optical port 410 may be connected to optical connections such as the connections 210 shown in FIG. 2. In the embodiment shown in FIG. 4A, the photodiode 408 is connected to a transimpedance amplifier 412 which converts the weak current generated in the photodiode 408 to a higher current that is capable of driving various circuits in a fiber-optic controller (such as controllers 318, 322 and 328 FIG. 3) associated with receiving optical signals through a photodiode 408. The photodiode 408 and transimpedance 412 circuitry is connected to analog interface pins 408. The analog interface pins 408 are accessible by circuitry external to the optical module 320.

The optical module 320 further includes memory 336. In the example shown, the memory 336 is an EEPROM. Those of skill in the art however, will recognize that other types of memory may be used including but not limited to PROM, flash memory and the like. The memory 336 stores digital diagnostic information including operating parameters of the laser diode 402 and the photodiode 408. This digital diagnostic information is specific to the individual laser diode 402 and photodiode 408. The memory 336 may include various parameters such as but not limited to the following:

Setup functions. These generally relate to the required adjustments made on a part-to-part basis in the factory to allow for variations in component characteristics such as laser diode threshold current.

Identification. This refers to information identifying the optical module type, capability, serial number, and compatibility with various standards. While not standard, additional information, such as sub-component revisions and factory test data may also be included.

Eye safety and general fault detection. These functions are used to identify abnormal and potentially unsafe operating parameters and to report these to a host and/or perform laser shutdown, as appropriate.

Temperature compensation functions. For example, compensating for known temperature variations in key laser characteristics such as slope efficiency.

Monitoring functions. Monitoring various parameters related to the optical module operating characteristics and environment. Examples of parameters that may be monitored include laser bias current, laser output power, receiver power levels, supply voltage and temperature. Ideally, these parameters are monitored and reported to, or made available to, a host device and thus to the user of the optical module.

Power on time. The optical module's control circuitry may keep track of the total number of hours the optical module has been in the power on state, and report or make this time value available to a host device.

Margining. "Margining" is a mechanism that allows the end user to test the optical module's performance at a known deviation from ideal operating conditions, generally by scaling the control signals used to drive the optical module's active components.

Other digital signals. A host device may configure the optical module so as to make it compatible with various requirements for the polarity and output types of digital inputs and outputs. For instance, digital inputs are used for transmitter disable and rate selection functions while outputs are used to indicate transmitter fault and loss of signal conditions. The configuration values determine the polarity of one or more of the binary input and output signals. In some optical modules, these configuration values can be used to specify the scale of one or more of the digital input or output values, for instance by specifying a scaling factor to be used in conjunction with the digital input or output value.

Other digital diagnostic information may also be stored in the memory 336. Examples of testing optical elements and storing diagnostic information in the memory 336 is discussed in U.S. patent application Publication No. 2002/0149812, published Oct. 17, 2002, which is incorporated herein by reference.

Alternative embodiments may be implemented as a laser module 324 such as in FIG. 4B or a photosensitive module 326 such as in FIG. 4C. These embodiments implement the laser or photodiode functionality respectively of the optical module 320. Notably, while the photosensitive module 326 is shown implementing a photodiode 412, other photosensitive components may be used as well.

Figure 5:
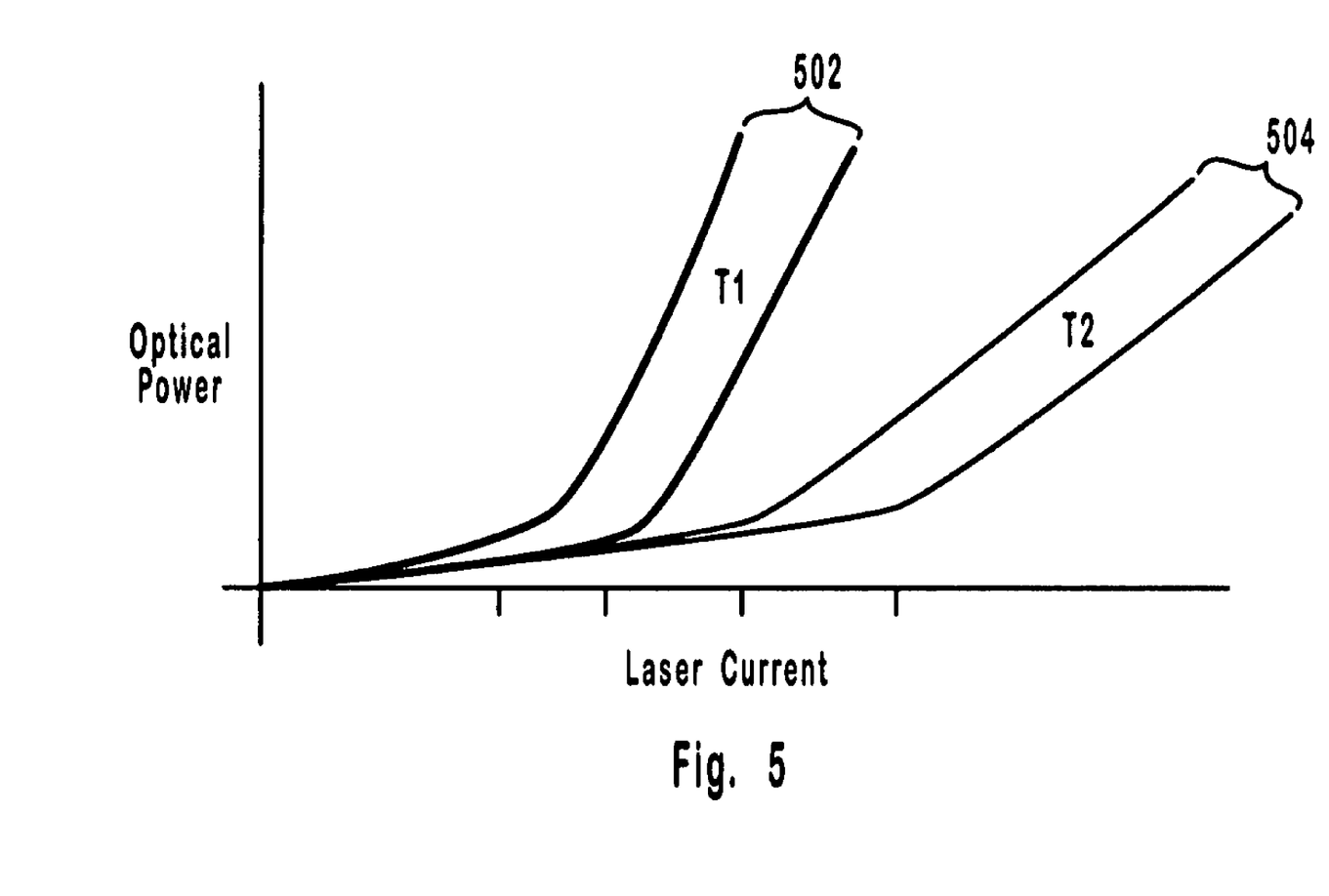
FIG. 5 illustrates exemplary operating curves for a laser diode.

Referring now to FIG. 5 one exemplary operating characteristic of a laser diode such as laser diode 402 in FIG. 4 is illustrated. FIG. 5 is a graph that correlates laser current running through laser diodes to optical power output by the laser diodes. Generally, the operating characteristics of laser diodes differ from laser diode to laser diode. However, the operating characteristics will generally fall within a certain range of operating characteristics. The graph of FIG. 5 illustrates this principle as two ranges of laser current to optical power curves 502 and 504. The first range 502 illustrates a range of laser current to optical power for laser diodes when the laser diodes are operated at a first temperature labeled T1. As temperature increases to a higher temperature T2, the same laser diodes will exhibit different optical characteristics such as the second range 504.

Similar to the graph shown in FIG. 5, other graphs exist for components such as photodiodes. The graph for a photodiode may, in one example, graph received optical power to a current generated in the photodiode as a function of a bias current across the photodiode. Still other operating characteristics of laser diodes and photodiodes may be generated. These graphs may include, for example, bias voltages and currents as variables on the graph.

It is often desirable to precisely control the optical output of laser diodes. Likewise, it is often desirable to correlate the signal received from a photodiode to a specific current output to other circuitry. Conventionally, laser drivers are matched to laser diodes such that a digital signal fed into the laser driver will cause a specific optical power to be generated by the laser diode. Likewise, post amplifiers connected to photodiodes have heretofore been matched with the photodiode to cause a specific current to be generated when an optical signal is received by the photodiode. However, embodiments of the present invention contemplate allowing randomly selected controllers such as the controllers 318, 322, 328 shown in FIG. 3 to be matched with randomly selected optical modules, laser modules and photosensitive modules such as those shown in FIG. 3.

Thus, some embodiments of the present invention allow for information such as operating characteristics to be stored in memory such as memory 336 shown in FIGS. 4A, 4B and 4C, such that the operating characteristics are accessible by a controller, such as through a digital interface like the digital connections 334 shown in FIG. 3. These digital connections are, in one embodiment, an I$^2$C or MDIO bus. In this way the controller can adapt driving signals or amplifiers to the specific optical module, laser module, and/or photosensitive module that the controller is connected to.

Notably, the memory 336 may be updateable by a host device such as the network client 204. As noted above, the memory may be used in digital diagnostic functions and thus may need to be updated as operating characteristics or conditions change. Thus, the host device or an optical controller can update entries in the memory 336 as needed.

Some embodiments contemplate methods for generating calibration data or operating characteristics to be stored in memory 336 (FIG. 3) for access by controller modules in adapting to optical modules, laser modules, and/or photosensitive modules connected to the controller module. While the methods may describe various steps or acts in a particular order, embodiments do not necessarily require, unless expressly stated, that the steps or acts be performed in the order set forth herein. Some embodiments are particularly well suited to performing the steps or acts in any appropriate order or substantially simultaneously.

One such method includes testing optical components, such as laser diodes and photodiodes that are to be installed in or that are already installed in an optical module. Testing may include operating the optical components at various operating points to determine characteristics of the optical components. The operating points may include, in one example, different operating temperatures. The optical components may be tested at the maximum and minimum expected operating temperatures. Other operating points may be different bias voltages and currents. Those skilled in the art will appreciate that still other operating points may be tested to generate operating characteristics.

A digital representation of the operating characteristics is generated. Generating the digital representation can be accomplished in several different ways while still remaining within the scope of embodiments of the present invention. For example, in one embodiment, coefficients may be generated such as those in a Legendre polynomial or other expansion coefficients that represent an operating characteristic graph such as that shown in FIG. 5. In an alternative example, the digital representation may be end points of a curve. By examining FIG. 5, it will be noted that as laser current increases there is a point at which the optical power is substantially linear with respect to further increases in laser current. Thus, to represent a linear portion of the graph, only two end points need to be digitized. Alternatively, a single endpoint and a slope may be digitized. Lasers are generally only operated in the linear portion because that is the portions of the operating range where lasers laze. Thus, including only the linear portions is often sufficient.

Once the operating characteristics of the optical components have been digitized, the optical characteristics operating characteristics are stored in memory such as memory 336. As noted above, this memory may be any type of suitable memory including PROM, EEPROM, flash memory and the like.

Referring once again to FIG. 3, although not pictured, the optical module 320 and laser module 324 may include a monitor photodiode to regulate the operation of the laser 402, 416. The monitor photodiode provides an indication of the amount of optical power being emitted by a laser diode. A separate feedback interface may be included to connect the monitor photodiode to a controller such as the controllers 318, 322, 328 shown in FIG. 3. Using information from the monitor photodiodes and the memory 336, the controllers 318, 322, 328 and regulate control of the laser is the optical module 320 and laser module 324. Additionally, feedback from the monitor photodiode may be used to generate digital data to update the memory 336.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An optical module comprising:
    a laser;
    an analog interface coupled to the laser, the analog interface configured to receive electrical signals from a controller external to the optical module for driving the laser;
    a memory module in which is stored a digital representation of operating characteristics of the laser and digital diagnostic parameters including setup, eye safety, fault detection, temperature compensation, power on time and margining; and a digital interface coupled to the memory module, the digital interface configured to allow the external controller to retrieve the digital representation of operating characteristics of the laser, wherein the digital representation of operating characteristics comprises a correlation of a linear portion of each of a plurality of laser current to optical power curves each corresponding to a different laser operating temperature, the linear portion being above a threshold amount of laser current.

2. The optical module of claim 1, wherein the digital representation of operating characteristics comprises end points of a curve.

3. The optical module of claim 1, wherein the digital representation of operating characteristics comprises an end-point and slope of a curve.

4. The optical module of claim 1, wherein the digital diagnostic parameters further include at least one of identification and monitoring.

5. The optical module of claim 4, wherein at least a portion of the digital diagnostic parameters is updateable by a host device.

6. The optical module of claim 1 further comprising:
a monitor photodiode optically coupled to the laser; and
a feedback interface coupled to the monitor photodiode and accessible to a controller external to the optical module.

7. A system comprising the optical module of claim 1 and a controller that is externally coupled to the optical module and that controls operation of the optical module,
wherein the controller is adapted to deliver and/or receive signals to and/or from the optical module based on the digital representation of operating characteristics,
wherein the optical module is one of a plurality of types of optical modules, and
wherein the controller is adapted to deliver and/or receive signals complying with one of multiple standards and/or protocols to and/or from the optical module depending on the optical module type.

8. An optical module comprising:
a photosensitive device adapted to receive optical signals from a fiber-optic network;
a transimpedance amplifier coupled to the photosensitive device, the transimpedance amplifier configured to produce an analog electrical signal corresponding to the optical signals;
an analog interface coupled to the transimpedance amplifier configured to deliver the electrical signal to an external controller;
a memory module comprising:
a digital representation of operating characteristics of the photosensitive device; and
digital diagnostic parameters including identification, monitoring, power on time and margining; and
a digital interface coupled to the memory module, the digital interface configured to allow the external controller to retrieve the digital representation of operating characteristics of the photosensitive device and to adapt a post amplifier in the controller in dependence on the retrieved operating characteristics.

9. The optical module of claim 8 wherein the digital representation of operating characteristics comprises a correlation of current generated in the photosensitive device to optical power received by the photosensitive device.

10. The optical module of claim 8 wherein the digital representation of operating characteristics comprises a correlation of current generated in the photosensitive device and temperature of the photosensitive device to optical power received by the photosensitive device.

11. The optical module of claim 8 wherein the digital representation of operating characteristics comprises expansion coefficients.

12. The optical module of claim 11, wherein the expansion coefficients are a Legendre polynomial.

13. The optical module of claim 8 wherein the digital representation of operating characteristics comprises end points of a curve.

14. The optical module of claim 8, wherein the digital representation of operating characteristics comprises an end-point and slope of a curve.

15. The optical module of claim 8, wherein the digital diagnostic parameters further include at least one of setup, eye safety, fault detection, and temperature compensation.

16. The optical module of claim 15, wherein at least a portion of the digital diagnostic parameters is updateable by a host device.

17. The optical module of claim 8, wherein the photosensitive device is a photodiode.

18. An optical module comprising:
a laser;
a first analog interface coupled to the laser, the first analog interface configured to receive electrical signals from a controller external to the optical module for driving the laser;
a photosensitive device adapted to receive optical signals from a fiber-optic network;
a transimpedance amplifier coupled to the photosensitive device, the transimpedance amplifier configured to produce an analog electrical signal corresponding to the optical signals;
a second analog interface coupled to the transimpedance amplifier configured to deliver the electrical signal to the external controller;
a memory module in which is stored:
a digital representation of operating characteristics of the laser and the photosensitive device; and
digital diagnostic parameters including setup, identification, eye safety, fault detection, temperature compensation, monitoring, power on time and margining; and
a digital interface coupled to the memory module, the digital interface configured to allow the external controller to retrieve the operating characteristics of the laser and the photosensitive device and to adapt a laser driver in the controller and a post amplifier in the controller in dependence on the retrieved operating characteristics,
wherein the digital representation of operating characteristics comprises a correlation of a linear portion of each of a plurality of laser current to optical power curves each corresponding to a different laser operating temperature, the linear portion being above a threshold amount of laser current.

19. The optical module of claim 18, wherein the digital representation of operating characteristics comprises expansion coefficients.

20. The optical module of claim 18, wherein the digital representation of operating characteristics comprises a Legendre polynomial.

21. The optical module of claim 18 wherein the digital representation of operating characteristics comprises end points of a curve.

22. The optical module of claim 18, wherein the digital representation of operating characteristics comprises an end-point and slope of a curve.

23. The optical module of claim 18, wherein at least a portion of the digital diagnostic parameters is updateable by a host device.

24. A system comprising the optical module of claim 18 and a controller that is externally coupled to the optical module and that controls operation of the optical module, wherein the controller is adapted to deliver driving signals to the laser based on the digital representation of operating characteristics of the laser and wherein the controller is a universal controller adapted to recognize a protocol of received data and to comply with the recognized protocol when driving the delivered driving signals to the laser module.

* * * * *

UNITED STATES PATENT AND TRADEMARK OFFICE
CERTIFICATE OF CORRECTION

PATENT NO. : 8,068,739 B2  Page 1 of 1
APPLICATION NO. : 10/866483
DATED : November 29, 2011
INVENTOR(S) : Levinson It is certified that error appears in the above-identified patent and that said Letters Patent is hereby corrected as shown below:

On the title page, item (74), under "Attorney, Agent, or Firm", in Column 2, Line 1, delete "Machoff" and insert -- Maschoff --, therefor.

In Column 2, Line 27, delete "802.11" and insert -- 802.11g --, therefor.

In Column 5, Line 60, delete "Generally;" and insert -- Generally, --, therefor.

Signed and Sealed this
Tenth Day of July, 2012

David J. Kappos
*Director of the United States Patent and Trademark Office*